United States Patent
Chen

(10) Patent No.: US 6,779,007 B1
(45) Date of Patent: Aug. 17, 2004

(54) WIDE SHIFT ARRAY STRUCTURE WITH LOW-VOLTAGE EXCURSION SENSING

(75) Inventor: Feng Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,404

(22) Filed: Mar. 31, 2000

(51) Int. Cl.[7] .............................................. G06F 15/00
(52) U.S. Cl. ..................................................... 708/209
(58) Field of Search ......................................... 708/209

(56) References Cited

U.S. PATENT DOCUMENTS 6,081,825 A * 6/2000 Kohchi et al. ............... 708/801
6,381,622 B1 * 4/2002 Lie ............................. 708/211

OTHER PUBLICATIONS

Takahashi et al, "1 GHz Logic Circuits With Sense Amplifiers" pp. 110–111, 1998 IEEE.*
O. Takahashi, N. Aoki, J. Silberman, S. Dhong, *IGHz Logic Circuits with Sense Amplifiers*, 1998 Symposium on VLSI Circuits Digest of Technical Papers, p. 110.

* cited by examiner

Primary Examiner—Tan V. Mai
(74) Attorney, Agent, or Firm—Marger Johnson & McCollom, P.C.

(57) ABSTRACT

A digital shifter apparatus features an n-bit wide shifter configured as a two-dimensional array of $n^2$ bit pass-through cells placed at substantially regular intervals within the array in n rows of n columns each, and plural low-voltage swing (LVS) sense amplifiers coupled with the n rows for sensing a low-voltage excursion bit value corresponding with a shifted digital output. Preferably, each of the plural bit storage cells includes a complementary pair of transistor gates producing a differential output signal pair representing a datum shifted into the corresponding cell. However, in a wide shift array, the heavy load on the differential multiplexor (mux) output makes the signal develop slowly, which results in only a small differential signal (e.g. approximately 100 mV) in a high-speed shift operation. The use of a small signal sense amplifier overcomes the problem mentioned above. In accordance with the invention, n such sense amplifiers are coupled with n corresponding differential output signal pairs, with each of the n sense amplifiers being responsive to a low-voltage-swing differential output signal pair to produce a high-voltage digital output signal compatible with normal digital circuits.

20 Claims, 4 Drawing Sheets

WIDE SHIFT ARRAY STRUCTURE WITH LOW-VOLTAGE EXCURSION SENSING

FIELD OF THE INVENTION

The present invention relates to arithmetic and logic bit-shifting and bit-rotating architectures, and more particularly to a wide shift array structure that features low-voltage excursion sensing.

BACKGROUND OF THE INVENTION

High-speed shift and rotation of bits within a field are required in a variety of arithmetic and logic applications for digital processors, e.g. core and auxiliary microprocessors embedded in computers and attached controllers. Floating-point units (FPUs) require particularly high-speed shift logic for normalization of operands within registers and along data paths. But simple (single-bit) or complex (plural-bit) shift and rotate instructions also may benefit from high-speed operation of shift logic. Numerous other applications such as digital signal processing (DSP), video imaging and enhancement, telecommunications and multimedia data manipulation, may benefit from high speed shift logic. In nearly all such applications, the width of the bit field to be shifted or rotated is increasing, with multi-word, i.e. thirty-two bit double-word and sixty-four bit quad-word, manipulations having already become commonplace.

Conventional shift logic requires multi-level multiplexing and buffering to accommodate wide bit fields, i.e. bit fields of more than four bits. This is primarily due to the speed requirements of the logic, which typically must produce shifted outputs at very high frequencies. It is also due to heavy current draws through parallel bit cells across the width of the shift logic versus the high voltage excursion output requirements of sensing circuits. It also is due at least in part to the relatively limited fan-in of complimentary metal oxide semiconductor (CMOS) gates that are used in their semiconductor implementation.

A sixty-four bit wide, two-dimensional rotational shift array have been proposed to operate at frequencies up to 1.0 Gigahertz (GHz). Such is reported in 1 GHz Logic Circuits with Sense Amplifiers, O. Takahashi, N. Aoki, J. Silberman and S. Dhong, 1998 Symposium on VLSI Circuits Digest of Technical Papers. The described rotational shift register (ROT) uses CMOS pass transistors, and a 1.8-volt VDD rail. ROT responsive to single-ended (not differential) inputs (A0–A63, R0–R63) produces single-ended outputs (B0–B63).

Another conventional approach to bit shifting and rotation is an array of connected single complementary transmission gates with pre-encoded shifting controls. Such a shift array typically uses either dynamic or static CMOS pass gates.

A recent development in shifting and rotation architectures is the dual-rail domino logic for use in floating point processors. With dual-rail domino designs, data are represented as differential signal pairs having complementary components. The dual-rail domino design features a multi-level shifter in which partial shift results are required to be routed to a next level of logic for further Boolean combination, with attendant propagation delay per level. Thus, the dual-rail domino design exhibits relatively high speed but the fact that it requires multiple levels of wide logic gates and routing of double signal pairs across each logic level and between successive logic levels creates a circuit density problem due to the wide routing channels that are required.

Data signal line and control signal line transitions induce voltage fluctuations in adjacent signal lines, a phenomenon called cross-talk. With cross-talk, data may be misinterpreted by the successive (downstream) logic circuitry. High-density layouts exacerbate the cross-talk problem because of the closer coupling between unrelated but physically proximate signals. Cross-talk occurs even when adjacent signals are routed on different layers within a circuit and even when signals are routed perpendicular to one another, although most common is cross-talk between signals that are routed in parallel on the same layer. High-voltage excursions on data signal lines also exacerbate the cross-talk problem. This is because the greater the voltage excursion, the greater the cross-talk inducement. Cross-talk creates a risk of misreading a datum, or shifted-in element, within a shift array structure.

The use of differential signal representation and small signal sensing can greatly improve the robustness of a circuit against the common mode noise introduced by cross-talk coupling and also can improve the speed-power product of the circuits.

Thus, there is a need for high-speed, low-power wide bit shift arrays compatible with the ever-increasing speed-power products that characterize current and future central processor units (CPUs), floating point processors (FPUs) and the like.

The foregoing and other objects, features and advantages of the invention will become more readily apparent from the following detailed description of a preferred embodiment, which proceeds with reference to the drawings.

DETAILED DESCRIPTION OF THE PREFERRED EMBODIMENT

Figure 1:
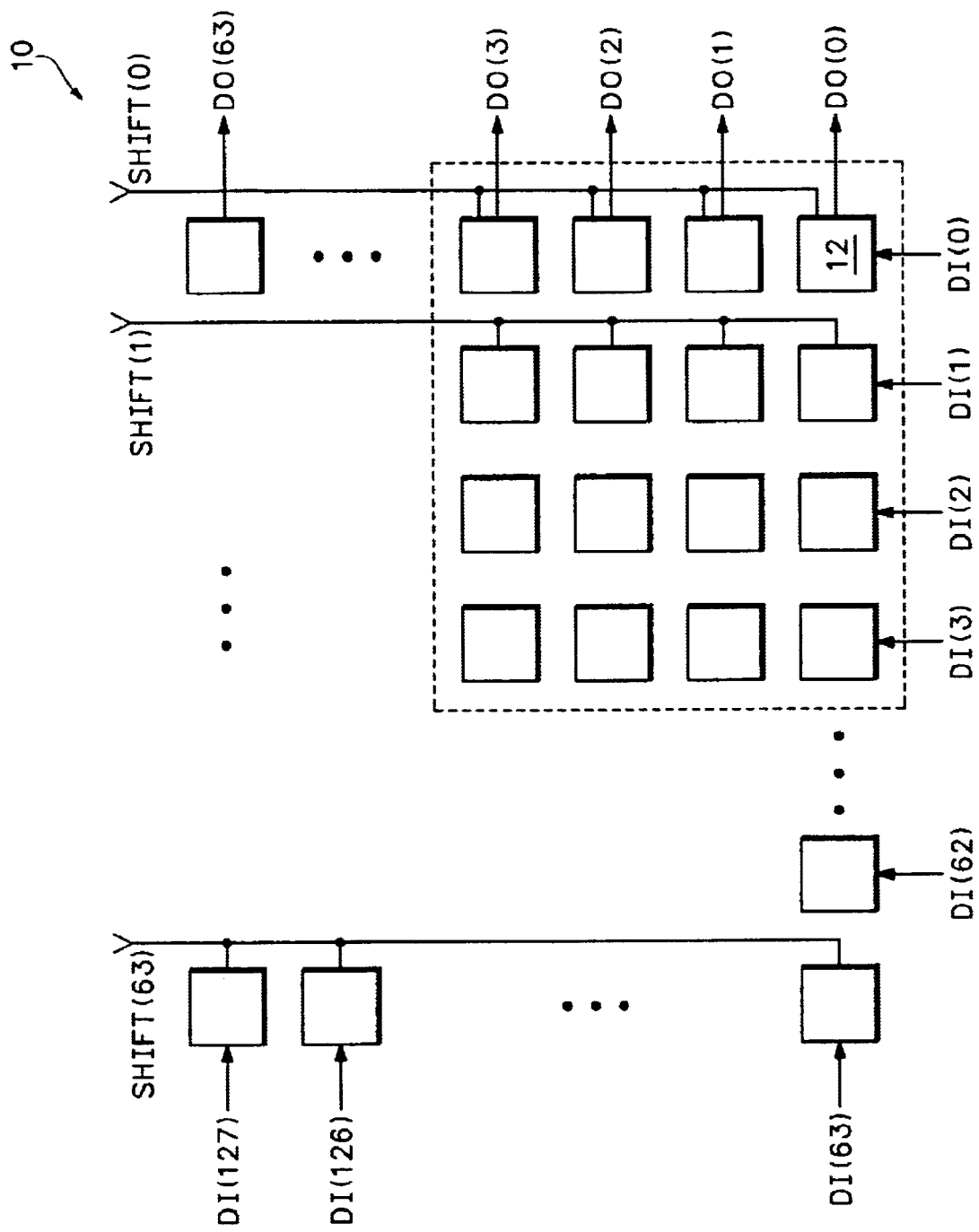
FIG. 1 is a schematic block diagram of a sixty-four bit-wide shift array structure in accordance with the invention.

FIG. 1 shows a sixty-four bit wide shift array structure 10, in accordance with the invention, in simplified schematic diagram form. Array structure 10 includes $64_2$=4096 pass-through shift cells such as cell 12 arranged in sixty-four rows and sixty-four columns, only twenty-five of which are shown for the sake of simplicity. Shift array inputs DI(0) –DI(127) are arrayed orthogonal along the bottom horizontal and left vertical margins; shift control inputs SHIFT(0) –SHIFT(63) are arrayed along the upper horizontal margin; and shift array outputs DO(0)–DO(63) area arrayed along the right vertical margin. Not shown for the sake of clarity in FIG. 1 are the sense amplifiers or the clock signal that respectively drive and enable shift array outputs DO(0)–DO(63) onto the output bus as representative of the shifted inputs to the array. Those of skill in the art will appreciate that array structure 10 supports shifting of a 128 bit wide input in either direction by as many as 64 bit positions to produce a 64 bit wide shifted output. For example, input bit DI(0) may appear after shifting as output bit DO(0), input bit DI(1) may appear after shifting as either one of output bits DO(0) or DO(1), input bit DI(2) may appear after shifting as any one of output bits DO(0)–DO(2), etc. As will be appreciated, a dashed square outlines sixteen least significant bits of array structure 10, to be described in more detail by reference to FIG. 2.

Those of skill in the art will appreciate that the invention contemplates shift array structures like array structure 10 described and illustrated herein but having different dimensions, circuit topologists and devices. For example, a shift array structure of narrower or wider dimension or having a different geometry may by extension be implemented in accordance with the principles demonstrated herein, within the spirit and scope of the invention.

Figure 2:
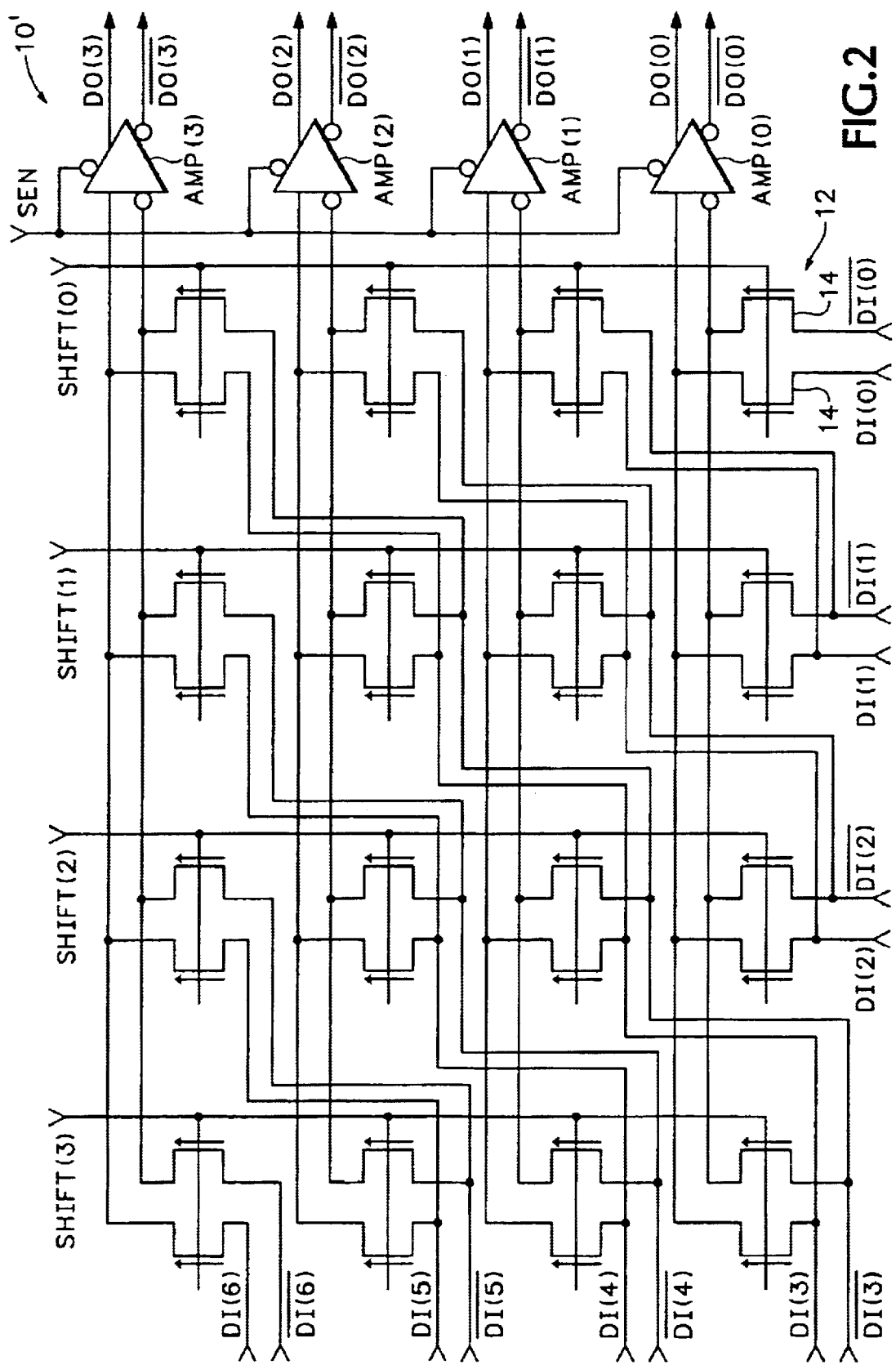
FIG. 2 is a detailed schematic diagram of a four bit-wide shift array slice that forms a part of the array structure of FIG. 1.

FIG. 2 is a detailed schematic representation of a four-bit wide slice 10' (embraced by a square dashed outline in FIG. 1) of the invented wide shift array structure represented more completely but only schematically in FIG. 1. Array slice 10' may be understood to represent a 4-bit position, unidirectional shift array in which complementary data input signals DI(0)–DO(6) (with their complements indicated by over-lining) may be shifted by as many as four bit positions and output as complementary data output signals DO(0)–DO(3) upon selection and command. Selection of the number of bit positions to be shifted is via a command field SHIFT(0)–(3), and the shifted data signals DO(0)–DO(3) are sensed in response to a clock signal SEN. Thus, FIG. 2 represents a four-bit wide shift array building block from which, as seen in FIG. 1, wider shift arrays may within the spirit and scope of the invention be made.

Referring still to FIG. 2, each pass-through cell such as typical cell 12 within the two-dimensional shift array slice 10' may be seen to comprise a complementary pair of NMOS transistors 14, 16 corresponding with the complementary signal components of each DI(i). The $n^2$ pass-through cells 12 are arranged in a two-dimensional array of n rows by n columns wherein n is the width of the shift array structure (n=4 in the illustrated array slice of FIG. 2). DO(0)–DO(3) representing the shifted, sensed and latched data input signals are driven by sense amplifiers AMP(0)–(3).

Low voltage swing (LVS) logic takes small differential swing signals as low as 100 mV-which normally will not trigger successive (downstream) normal digital circuits and uses a sense amp to produce a normal full swing, e.g. 1.5V, output. By doing this, a small swing signal resulting from heavy load or complex logic circuitry, nevertheless can be sensed in a digital circuit. Typically, in digital logic, a voltaze differential of enough magnitude to cause the gates to change states is set to be close to the middle of a power supply level. For LVS logic, the swing is generally less than half the power supply level.

Those of skill in the art will appreciate from FIG. 2 that any one of DI(0)–DI(3) may be passed through the corresponding cell 12 to the output DO(0), any one of DI(1)–DI(4) may be passed therethrough to the output DO(1), any one of DI(2)–DI(5) may be passed therethrough to the output DO(2) and any one of DI(3)–DI(6) may be passed therethrough to the output DO(3) of array 10'.

Those of skill in the art will appreciate from FIGS. 1 and 2 that, by extension, and in accordance with a preferred embodiment of the invention, any bit field represented by DI(0)–DI(2n-1) may be shifted as it is passed through the corresponding $n_2$ cells in array 10 to the output DO(0)–DO(n-1). The extent of the shift is determined, as will be appreciated, by the value of the shift field SHIFT(0)–SHIFT(n-1), while the stable timing of the shift is determined, as will be appreciated, by the occurrence of a triggering (e.g. trailing) edge of the SEN clock pulse that clocks the post-shift output data.

Figure 3:
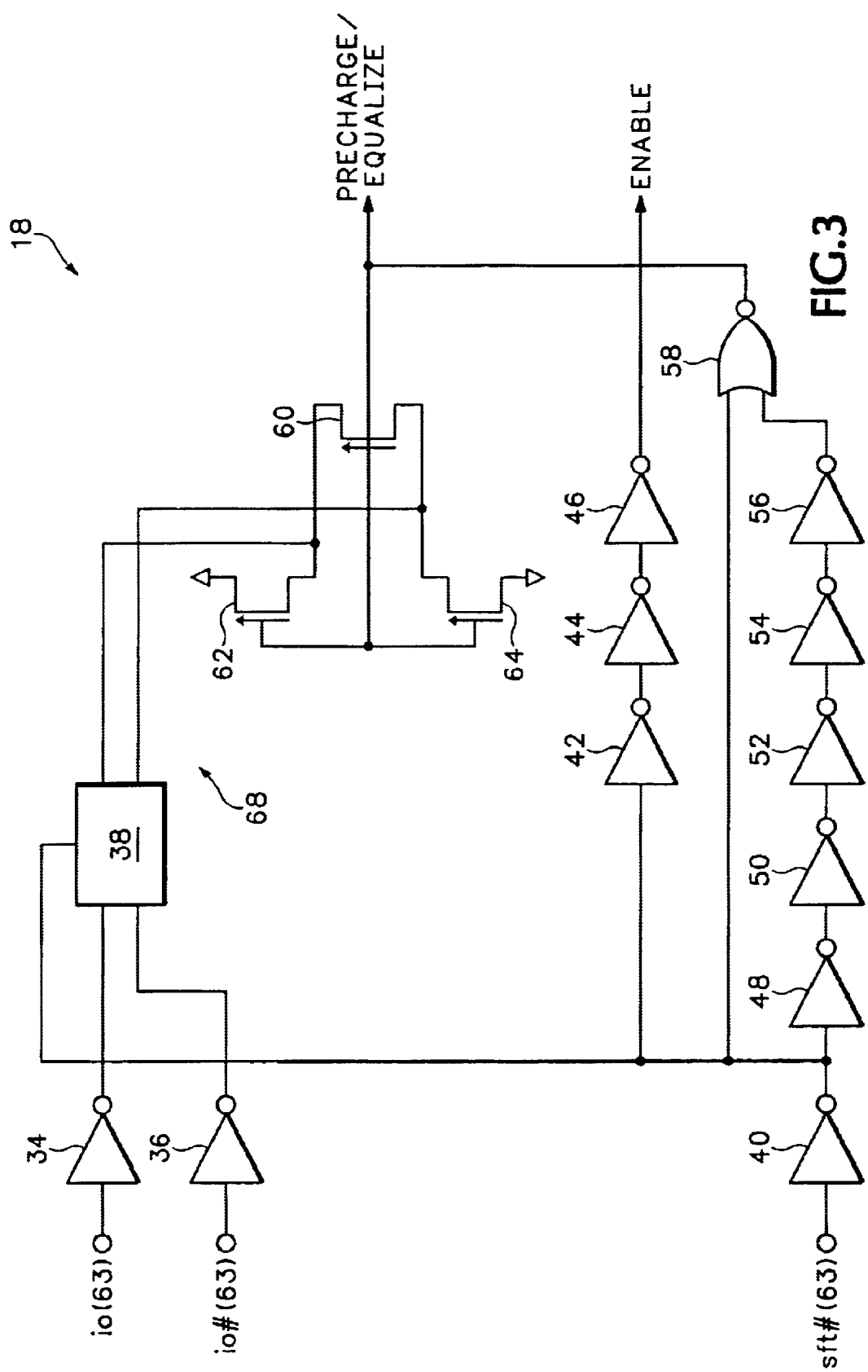
FIG. 3 is a schematic diagram of a precharge/equalize/timing circuit that forms a part of the array structure of FIG. 1.

FIG. 3 shows a precharge/equalize/timing circuit 18 that forms part of array 10'. Precharge/equalize circuit 18 may be seen to include delay elements and a pulse chopper.

FIG. 3 shows the clocking detail of a one-bit slice of array 10' of FIG. 2. Differential datum signals io(63) and io#(63), for example, are buffered by two inverters 34, 36 and their inverted outputs are input to the d and d# inputs of a multiplexor (mux) 38 (which will be understood to be implemented as a pair of NMOS transistors 14, 16 configured as the passthrough shift cell 12 shown in FIG. 2). The select signal sel of mux 38 is connected to the complement of the low-active shift signal sft# produced by an inverter 40. The output of inverter 40 also goes through a delay line comprising three series-connected inverters 42, 44, 46 to produce a low-active enable signal enable# to the sense amplifier (not shown in FIG. 3, but shown in FIG. 4). The implementation and process-specific delay is adjusted to match the delay through shift array 10', as is known. The output of inverter 40 also goes through a pulse-generator circuit comprising five inverters 48, 50, 52, 54, 56 and a NOR gate 58 to produce in accordance with one embodiment of the invention a pulse of sufficient duration to precharge and equalize the wires from shift out to sense input.

Figure 4:
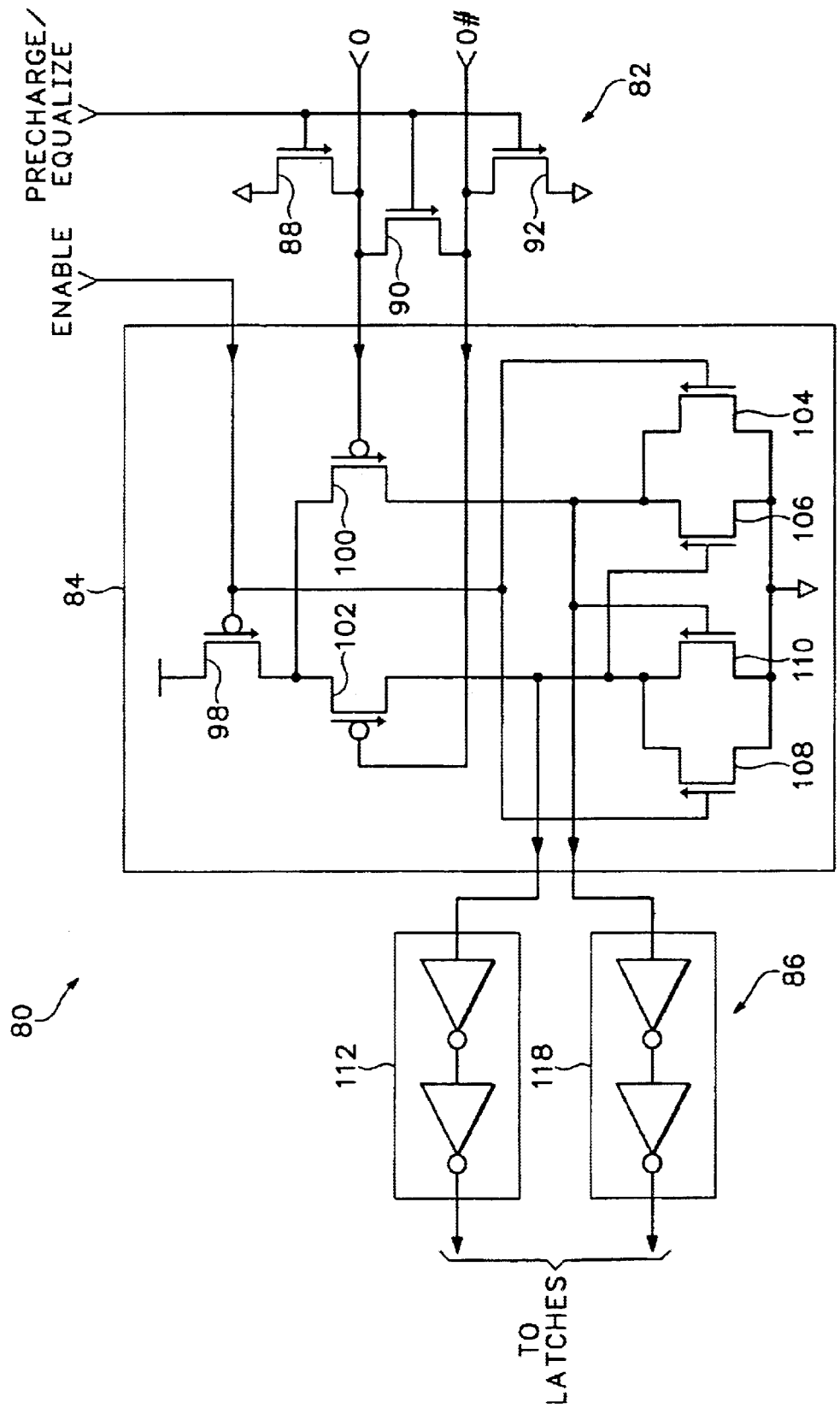
FIG. 4 is a detailed schematic diagram of a sense amplifier circuit that forms a part of the array structure of FIG. 1.

As may be seen from FIG. 3, the pulse drives three NMOS transistors 60, 62, 64 configured as shown, effectively establishing a sufficient precharge/equalize period of time prior to when the mux select (shift) is enabled and after the data is sensed by sense amplifier (not shown in FIG. 3 but shown in FIG. 4).

FIG. 4 shows a sense amplifier circuit 80 in detail. Circuit 80 may be seen to comprise three parts including an input circuit 82, a sense amplifier 84 and an output circuit 86. Discharge/equalize circuit 82 includes three NMOS transistors 88, 90, 92 with their gates all being driven in common by the precharge/equalize signal. Transistors 88 and 92 act as precharge devices and transistor 90 as equalization device. When they are enabled, they discharge and equalize the sense amp input pair (coming form the shift output) to a ground potential or level so that they start from the same potential when data is driven to the shift mux.

Sense amplifier 84 includes three PMOS transistors 98, 100, 102 and 4 NMOS device arranged as shown.

Transistor 102 and 100 are the input devices which receive the differential small signal from o and o#. Transistors 108 and 104 are the precharge devices with their gate connected to the enable signal. When enable is high (logic 1), they discharge all the intermediate nodes to ground. Transistor 98 is an evaluation device, with its gate connected to the enable signal. On the falling edge if the enable signal, transistors 98 along with transistor 102, 100, 110 and 106 will start evaluation, pulling one of the output nodes high and pulling one of the output nodes low (logic 0).

Those skilled in the art will appreciate that sense amplifier 84 and input discharge/equalize circuit 82 cooperate to sense a very small differential signal very quickly and to produce a differential full swing signal to drive the downstream logic circuits. The outputs can also be latched with conventional differential latch circuits.

Output drive circuit 86 will be understood by which those of skill in the art to be optional and not required in many implementations, as the outputs of sense amplifier 84 may drive an external latch directly. Drive circuit 86 can also drive the downstream dynamic logic directly with buffers 112 and 118. It will be appreciated that the complementary datum pair may be externally latched in accordance with known differential latches, or may be latched by specially designed, high-speed differential latches.

Thus, the invented wide shift array structure provides low-voltage excursion, or low voltage swing, sensing and high speed, and yet finds utility in the ever-increasing bit field widths that characterize increasingly parallel computer, processor, e.g. CPU, and co-processor, e.g. FPU, architectures. While the present invention effectively doubles the speed of wide shift arrays, it does so with an attendant savings in area and consumed power of approximately the same factor of two.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. Digital shifter apparatus comprising:
   an n-bit wide shifter configured as a two-dimensional array of $n^2$ bit pass-through cells placed at substantially regular intervals within the array in n rows of n columns each, and
   plural low-voltage swing (LVS) sense amplifiers coupled with said n rows for sensing a low-voltage excursion bit value corresponding with a shifted digital output, wherein each of the plural bit cells includes a complementary pair of transistor gates producing a differential output signal pair representing a datum shifted into the corresponding cell.

2. The apparatus of claim 1 wherein said n sense amplifiers are each coupled with a corresponding differential output signal pair, each of said n sense amplifiers being responsive to a low-voltage-swing differential input signal pair characterized by voltage excursions of less than or equal to approximately 300-millivolts.

3. The apparatus of claims 2, wherein the low-voltage-swing differential input signal pair is characterized by voltage excursions of less than or equal to approximately 150-millivolts.

4. The apparatus of claim 1 which further comprises a clock generation circuit coupled between the array and the sense amplifiers for establishing a timing sequence for sampling the shifted digital output.

5. The apparatus of claim 1, wherein adjacent pairs of cells are coupled to one another via local routed data lines of limited extent.

6. The apparatus of claim 1, wherein said sense amplifiers impose a delay therethrough from a start to a finish of a shift operation of less than approximately 250-picoseconds.

7. The apparatus of claim 1 which further comprises a precharge mechanism coupled with each of said sense amplifiers, said precharge mechanism precharging a differential wire pair corresponding to said sense amplifier to a ground level.

8. The apparatus of claim 1, wherein n is substantially greater than four.

9. The apparatus of claim 8, wherein n is greater than or equal to sixteen.

10. The apparatus of claim 9, wherein n is greater than or equal to thirty-two.

11. The apparatus of claim 10, wherein n is greater than or equal to sixty-four.

12. Digital shifter apparatus comprising:
   an n-bit wide shifter configured as a two-dimensional array of $n^2$ bit pass-through cells placed at substantially regular intervals within the array in n rows of n columns each, and
   plural low-voltage swing (LVS) sense amplifiers coupled with said n rows for sensing a low-voltage excursion bit value corresponding with a shifted digital output, wherein each of the plural bit cells includes a complementary pair of transistor gates producing a differential output signal pair representing a datum shifted into the corresponding cell, and
   wherein said n sense amplifiers are each coupled with a corresponding differential input signal pair, each of said n sense amplifiers being responsive to a low-voltage-swing differential output signal pair characterized by voltage excursions of less than or equal to approximately 300-millivolts and produce differential full swing digital outputs 13. The apparatus of claim 12 which further comprises a clock generation circuit coupled between the array and the sense amplifiers for establishing a timing sequence for sampling the shifted digital output.

14. The apparatus of claim 12, wherein adjacent pairs of cells are coupled to one another via local routed data lines of limited extent.

15. The apparatus of claim 12, wherein said sense amplifiers impose a delay therethrough from a start to a finish of a shift operation of less than approximately 250-icoseconds.

16. The apparatus of claim 12, which further comprises a precharge mechanism coupled with each of said sense amplifiers, said precharge mechanism precharging a differential wire pair corresponding to said sense amplifier to a ground level.

17. The apparatus of claim 12, wherein n is substantially greater than four.

18. The apparatus of claim 12, wherein n is greater than or equal to sixteen.

19. The apparatus of claim 12, wherein n is greater than or equal to thirty-two.

20. The apparatus of claim 12, wherein n is greater than or equal to sixty-four.

* * * * *

UNITED STATES PATENT AND TRADEMARK OFFICE
CERTIFICATE OF CORRECTION

PATENT NO. : 6,779,007 B1
DATED : August 17, 2004
INVENTOR(S) : Chen

It is certified that error appears in the above-identified patent and that said Letters Patent is hereby corrected as shown below:

Column 5,
Line 41, "of claims 2, wherein" should read -- of claim 2, wherein --.

Column 6,
Line 31, "swing digital outputs" should read -- swing digital outputs. --.
Line 41, "250-icoseconds." should read -- 250-picoseconds. --.
Line 42, "of claim 12, which" should read -- of claim 12 which --.

Signed and Sealed this

Twenty-eighth Day of June, 2005

JON W. DUDAS
*Director of the United States Patent and Trademark Office*